(12) United States Patent
Sai

(10) Patent No.: US 11,101,873 B2
(45) Date of Patent: Aug. 24, 2021

(54) CONTROL DEVICE, PROGRAM, CONTROL METHOD, AND FLIGHT VEHICLE

(71) Applicant: HAPSMobile Inc., Tokyo (JP)

(72) Inventor: Jutatsu Sai, Kanagawa (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/114,353

(22) Filed: Dec. 7, 2020

(65) Prior Publication Data
US 2021/0091848 A1 Mar. 25, 2021

Related U.S. Application Data

(63) Continuation of application No. PCT/JP2019/029963, filed on Jul. 31, 2019.

(30) Foreign Application Priority Data

Sep. 11, 2018 (JP) .............................. JP2018-170064

(51) Int. Cl.
*H04W 24/04* (2009.01)
*H04W 84/06* (2009.01)
(Continued)

(52) U.S. Cl.
CPC ....... *H04B 7/18504* (2013.01); *B64C 39/024* (2013.01); *H01Q 1/28* (2013.01);
(Continued)

(58) Field of Classification Search
None
See application file for complete search history.

(56) References Cited

U.S. PATENT DOCUMENTS 6,968,187 B1 * 11/2005 Irwin .................. H04B 7/18504
342/352
10,034,209 B1 7/2018 Nandan
(Continued)

FOREIGN PATENT DOCUMENTS

EP 2978258 A1 1/2016
GB 2354673 A 3/2001
(Continued)

OTHER PUBLICATIONS

Decision to Grant a Patent issued for counterpart Japanese Application No. 2018-170064, issued by the Japanese Patent Office dated Apr. 7, 2020 (drafted on Apr. 2, 2020).
(Continued)

*Primary Examiner* — Ajit Patel

(57) ABSTRACT

Provided is a control device for controlling flight vehicles, including a replacement control unit for controlling replacement of a first flight vehicle covering a target area on the ground by a cell in a first frequency band with a second flight vehicle, in which the replacement control unit is for controlling the replacement such that, after the second flight vehicle moves to a location corresponding to a location of the first flight vehicle, the first flight vehicle continues using one part of a frequency band in the first frequency band and stops using a remaining part of the frequency band, and also the second flight vehicle forms a cell in a frequency band excluding the one part of the frequency band but including the remaining part of the frequency band, which overlaps with the cell formed by the first flight vehicle, and the first flight vehicle stops forming the cell.

20 Claims, 8 Drawing Sheets

(51) Int. Cl.

| | | |
|---|---|---|
| *H04B 7/185* | (2006.01) | |
| *H04W 4/40* | (2018.01) | |
| *H04W 36/00* | (2009.01) | |
| *B64C 39/02* | (2006.01) | |
| *H01Q 1/28* | (2006.01) | |
| *H04W 36/32* | (2009.01) | |
| *H04W 72/04* | (2009.01) | |

(52) U.S. Cl.
CPC .......... *H04B 7/18506* (2013.01); *H04W 4/40* (2018.02); *H04W 36/0009* (2018.08); *H04W 36/0061* (2013.01); *H04W 36/00837* (2018.08); *H04W 36/32* (2013.01); *H04W 72/0453* (2013.01); *B64C 2201/122* (2013.01); *B64C 2201/14* (2013.01)

(56) References Cited

U.S. PATENT DOCUMENTS

| | | | |
|---|---|---|---|
| 10,506,483 B1* | 12/2019 | Williamson | H04W 36/12 |
| 10,615,873 B1* | 4/2020 | Behroozi | H04B 10/1129 |
| 2002/0049055 A1 | 4/2002 | Matthews | |
| 2002/0072332 A1* | 6/2002 | Chang | H04B 7/18508 455/430 |
| 2005/0164701 A1* | 7/2005 | Karabinis | H04B 7/2041 455/428 |
| 2014/0373124 A1 | 12/2014 | Rubin | |
| 2015/0236778 A1* | 8/2015 | Jalali | H04B 7/18504 370/316 |
| 2016/0156406 A1 | 6/2016 | Frolov | |
| 2016/0205560 A1* | 7/2016 | Hyslop | H04B 7/18504 455/454 |
| 2016/0255580 A1 | 9/2016 | Onaka | |
| 2017/0208512 A1 | 7/2017 | Aydin | |
| 2018/0054251 A1* | 2/2018 | Alex | G01S 19/54 |
| 2018/0083678 A1* | 3/2018 | Alexander | H04B 7/0404 |
| 2018/0166779 A1* | 6/2018 | Feria | H01Q 21/22 |
| 2018/0276993 A1* | 9/2018 | Chow | G08G 5/0013 |
| 2018/0279133 A1* | 9/2018 | Gayrard | H04B 7/026 |
| 2018/0375568 A1* | 12/2018 | De Rosa | H04W 72/04 |
| 2018/0376393 A1* | 12/2018 | Wu | H04B 7/18519 |
| 2019/0028197 A1* | 1/2019 | Turner | H04B 10/118 |
| 2019/0207676 A1* | 7/2019 | Noerpel | H04B 7/2041 |
| 2020/0221357 A1* | 7/2020 | Hong | H04W 36/0085 |
| 2020/0252941 A1* | 8/2020 | Schmidt | H04W 72/082 |

FOREIGN PATENT DOCUMENTS

| | | |
|---|---|---|
| JP | 2002211496 A | 7/2002 |
| JP | 2003509951 A | 3/2003 |
| JP | 2017130983 A | 7/2017 |
| JP | 2017521962 A | 8/2017 |
| WO | 9907083 A1 | 2/1999 |

OTHER PUBLICATIONS (ISA/237) Written Opinion of the International Search Authority for International Patent Application No. PCT/JP2019/029963, mailed by the Japan Patent Office dated Oct. 21, 2019.

(ISA/237) Written Opinion of the International Search Authority for International Patent Application No. PCT/JP2019/029020, mailed by the Japan Patent Office dated Sep. 10, 2019.

Office Action issued for Japanese Application No. 2018-174305, issued by the Japanese Patent Office dated Dec. 17, 2019 (drafted on Dec. 10, 2019).

Decision to Grant a Patent issued for Japanese Application No. 2018-174305, issued by the Japanese Patent Office dated Feb. 18, 2020 (drafted on Feb. 7, 2020).

Extended European Search Report for European Patent Application No. 19860339.1, issued by the European Patent Office dated Jun. 21, 2021.

* cited by examiner

CONTROL DEVICE, PROGRAM, CONTROL METHOD, AND FLIGHT VEHICLE

The contents of the following Japanese and PCT applications are incorporated herein by reference:
NO. 2018-170064 filed in JP on Sep. 11, 2018,
NO. PCT/JP2019/029963 filed in WO on Jul. 31, 2019.

BACKGROUND

1. Technical Field

The present invention relates to a control device, a program, a control method, and a flight vehicle.

2. Related Art

To provide a stratospheric platform, a flight vehicle having an antenna and flies in a stratosphere has been proposed (for example, see Patent document 1).

CITATION LIST

Patent Document

[Patent Document 1] Japanese Unexamined Patent Application Publication No. 2002-211496

DESCRIPTION OF EXEMPLARY EMBODIMENTS

Hereinafter, the present invention will be described by way of embodiments of the invention, but the following embodiments are not intended to limit the invention specified in the claims. In addition, not all combinations of features described according to the embodiments are necessarily imperative to solving means of the invention.

Figure 1:
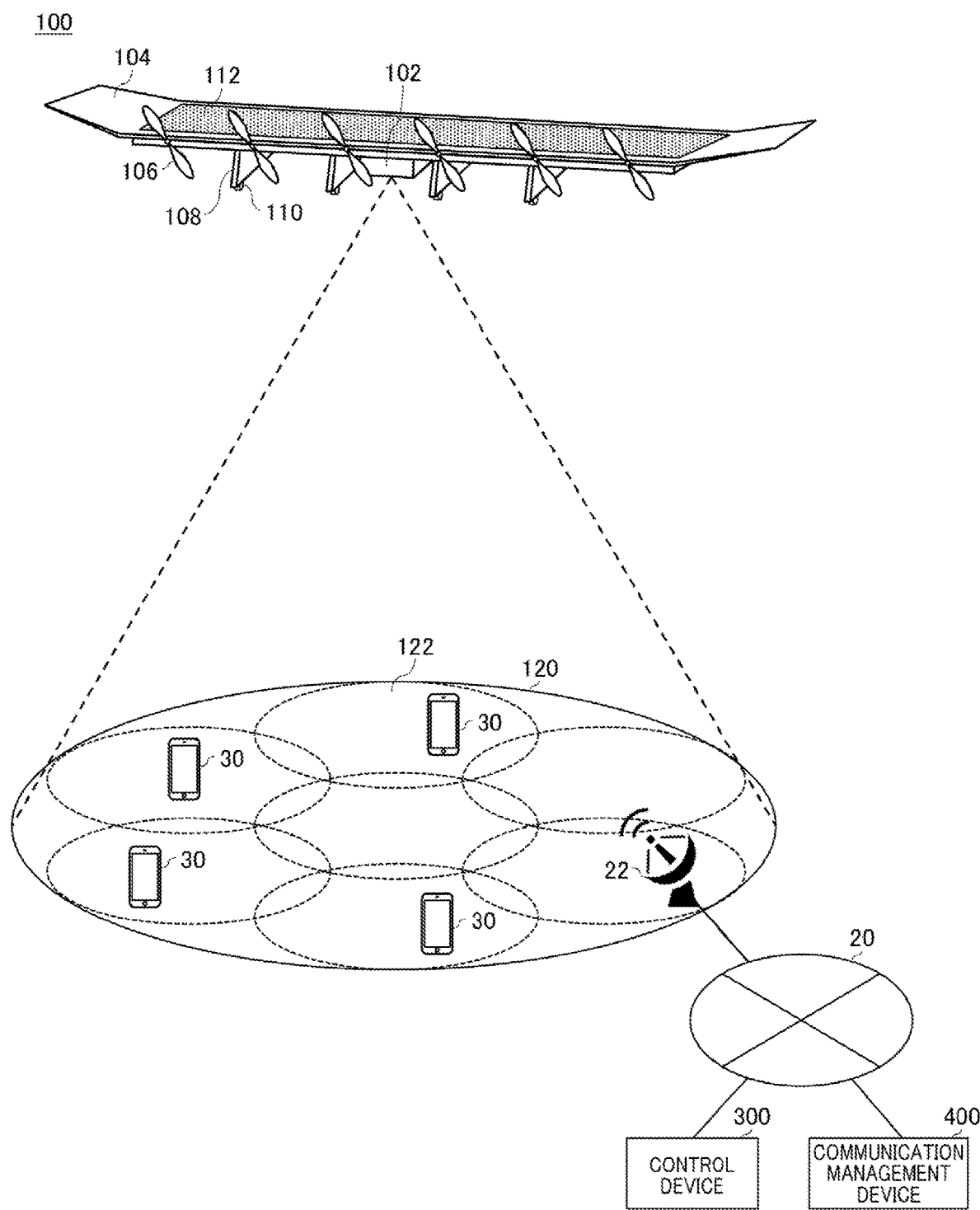
FIG. 1 schematically illustrates one example of a flight vehicle 100.

FIG. 1 schematically illustrates one example of a flight vehicle 100. The flight vehicle 100 includes a main body portion 102 and a main wing portion 104. The main body portion 102 has propellers 106, skids 108, and wheels 110. The main wing portion 104 has a solar panel 112.

The main body portion 102 includes a battery and an antenna which are not illustrated in the drawing. Electrical power generated by the solar panel 112 is stored in the battery. The flight vehicle 100 can fly by rotating the propellers 106 using the electrical power stored in the battery. In addition, the flight vehicle 100 forms a cell 120 on a ground by the antenna and provides wireless communication service to user terminals 30 in the cell 120. The antenna may be, for example, a multi-beam antenna. The cell 120 may be configured by a single cell. In addition, the cell 120 may also be configured by a plurality of sub-cells 122. That is, the cell 120 may be configured by multiple cells. The flight vehicle 100 flies in a stratosphere, for example, and provides wireless communication service to the user terminals 30 on the ground. The flight vehicle 100 may function as a stratospheric platform.

Each of the user terminals 30 may be any terminal as long as the terminal is a communication terminal that is communicable with the flight vehicle 100. For example, the user terminal 30 is a mobile phone such as a smart phone. The user terminal 30 may also be a tablet terminal, a personal computer (PC), and the like.

The flight vehicle 100 provides the wireless communication service to the user terminal 30, for example, by relaying communication between the user terminal 30 and a network 20 on the ground. The network 20 may include a core network provided by a carrier. In addition, the network 20 may include the Internet.

The flight vehicle 100 may communicate with the network 20 via a gateway 22 in the cell 120 among gateways 22 arranged in respective locations on the ground. In addition, for example, the flight vehicle 100 may communicate with the network 20 via a communications satellite which is not illustrated in the drawing.

The flight vehicle 100 sends data received from the user terminal 30 in the cell 120, for example, to the network 20. In addition, for example, in a case where data addressed to the user terminal 30 in the cell 120 is received via the network 20, the flight vehicle 100 sends this data to the user terminal 30.

The communication performed by the user terminal 30 via the flight vehicle 100 may be managed by a communication management device 400. The communication management device 400 is arranged, for example, in the core network of the carrier. The communication management device 400 may provide communication information related to the communication performed by the user terminal 30 via the flight vehicle 100. The communication information include, for example, a communication traffic of the communication carried out by the user terminal 30 via the flight vehicle 100. The communication management device 400 may send the communication information to a control device 300 via the network 20. Note that the control device 300 and the communication management device 400 may also be integrated with each other. That is, the control device 300 may also function as the communication management device 400.

The flight vehicle 100 may be controlled by the control device 300. The flight vehicle 100 flies following an instruction sent by the control device 300 via the network 20 and the gateway 22, for example.

The control device 300 controls the flight vehicle 100 by sending the instruction thereto. The control device 300 may cause the flight vehicle 100 to circle over a target area so as to cover the target area on the ground by the cell 120. The flight vehicle 100 circling over the target area to cover the target area may be referred to as a fixed point flight. The control device 300 may cause the flight vehicle 100 to carry out the fixed point flight for each of a plurality of target areas to cover each of the plurality of target area.

The control device 300 carries out replacement control processing for replacing the flight vehicle 100 that covers the target area with another flight vehicle 100. In a case where, for example, maintenance of the flight vehicle 100 that covers the target area is to be performed, the control device 300 replaces the flight vehicle 100 with the other flight vehicle 100. In addition, the control device 300 replaces the flight vehicle 100 that covers the target area with the other flight vehicle 100 at any timing following an instruction of an operator.

In a case where a first flight vehicle 100 that covers the target area is replaced with a second flight vehicle 100, for example, it is conceivable that the first flight vehicle 100 is caused to stop providing the wireless communication service, and the second flight vehicle 100 is caused to head off to a flight area where the first flight vehicle 100 has flown, and to start providing wireless communication service by the second flight vehicle 100. However, in this case, at the time of the replacement, a service interruption temporarily occurs, and a service quality temporarily deteriorates. In the case of a wireless base station installed on the ground, since a size of the cover area is limited, the temporal deterioration of the service quality is allowed, but in the case of the flight vehicle 100 that functions as the stratospheric platform, for example, the influence may be severe since the cover area is wide.

For example, the control device 300 according to the present embodiment controls the first flight vehicle 100 and the second flight vehicle 100 such that in a case where the first flight vehicle 100 that covers a target area on a ground by a cell in a first frequency band is replaced with the second flight vehicle 100, after the second flight vehicle 100 moves to a location corresponding to a location of the first flight vehicle 100, the first flight vehicle 100 continues using one part of a frequency band in the first frequency band and stops using a remaining part of the frequency band in the first frequency band, and also the second flight vehicle 100 forms a cell in a frequency band excluding the one part of the frequency band but including the remaining part of the frequency band, which overlaps with the cell formed by the first flight vehicle 100, and the first flight vehicle 100 carries out handover of the user terminal 30 present in the cell of the first flight vehicle 100 to the cell of the second flight vehicle 100, and stops forming the cell.

The location corresponding to the location of the first flight vehicle 100 may be, for example, within a flight path of the first flight vehicle 100. For example, in a case where the first flight vehicle 100 performs a fixed point flight, the location corresponding to the location of the first flight vehicle 100 may be within an orbit of the fixed point flight. In addition, the location corresponding to the location of the flight vehicle 100 may be any location within a range of a predetermined distance from the flight vehicle 100.

When the above-mentioned replacement processing is carried out, after the handover of the user terminal 30 present in the cell of the first flight vehicle 100 is carried out to the cell of the second flight vehicle 100, the cell of the first flight vehicle 100 is stopped, and the user terminal 30 can receive service by the second flight vehicle 100 following the service by the first flight vehicle 100. That is, the control device 300 according to the present embodiment can suppress the temporal service interruption and the temporal deterioration of the service quality that occur in the user terminal 30.

Note that at the time of the replacement, since the first flight vehicle 100 continues using the one part of the frequency band in the first frequency band and stops using the remaining part of the frequency band in the first frequency band, an operating band that can be used by the user terminal 30 in the target area is reduced. For example, in a case where the use of 50% of the first frequency band is continued and the use of the remaining 50% is stopped, the operating band that can be used by the user terminal 30 in the target area is halved. However, when an original use rate of a physical resource block (PRB) is 50% or below, the service quality is not decreased.

Figure 2:
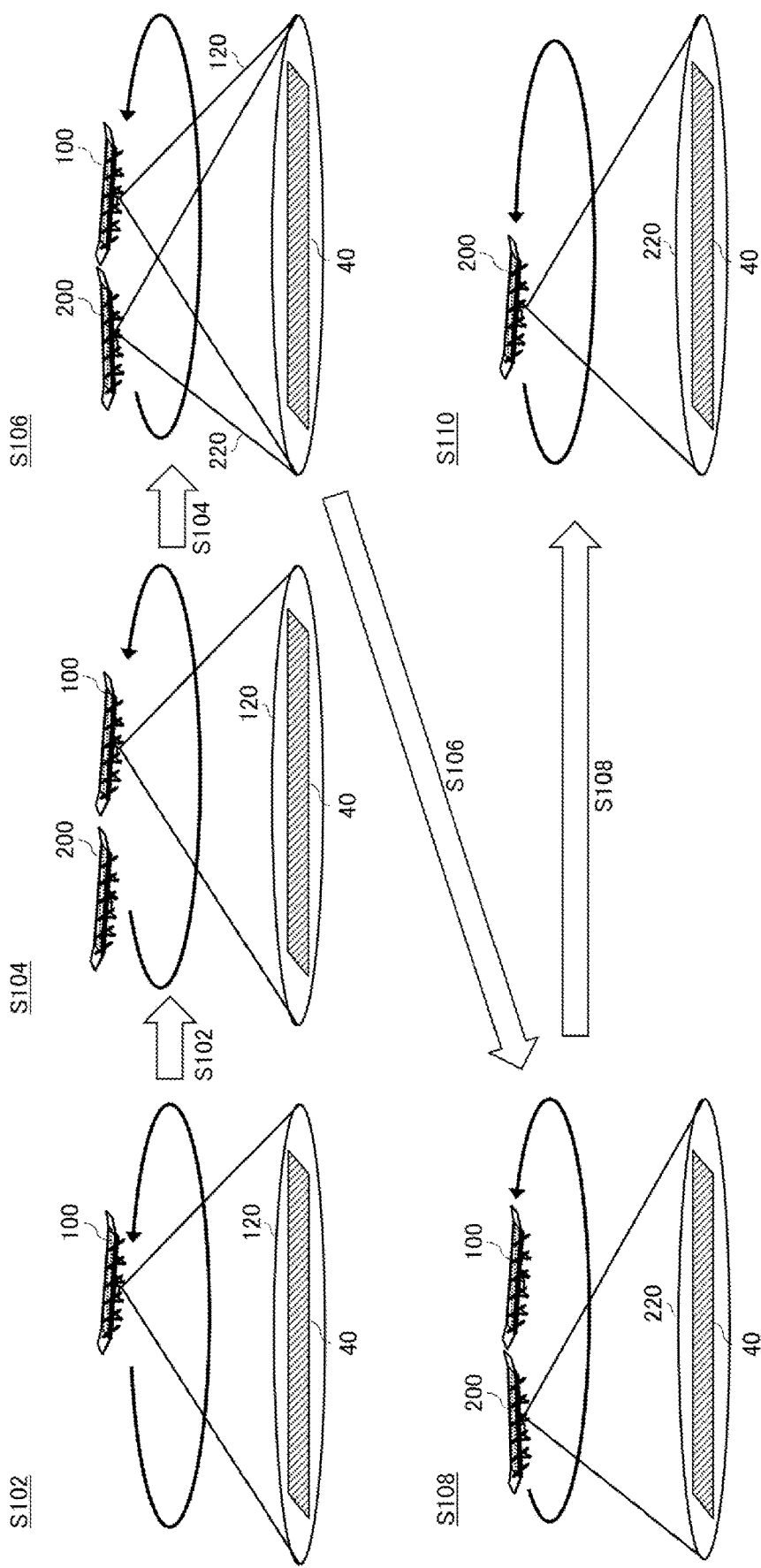
FIG. 2 schematically illustrates one example of a flow of replacement control processing by a control device 300.

FIG. 2 schematically illustrates one example of a flow of replacement control processing by the control device 300. Herein, processing for replacing the flight vehicle 100 with a flight vehicle 200 will be described as an example. The flight vehicle 200 has a configuration similar to that of the flight vehicle 100. The flight vehicle 100 and the flight vehicle 200 may carry out respective operations following instructions of the control device 300. In FIG. 2, description will be provided while a state where the flight vehicle 100 performs fixed point flight over a target area 40 and covers the target area 40 by the cell 120 in a first frequency band is set as a start state. Note that the illustration of the user terminal 30 is omitted.

In S102, the flight vehicle 200 reaches a location corresponding to a location of the flight vehicle 100. In S104, the flight vehicle 100 continues using one part of a frequency band in the first frequency band and stops using a remaining part of the frequency band in the first frequency band. In addition, the flight vehicle 200 forms a cell 220 that corresponds to a cell in a frequency band excluding the one part of the frequency band but including the remaining part of the frequency band, which overlaps with the cell 120 by the flight vehicle 100. Subsequently, the flight vehicle 100 carries out handover of the user terminal 30 present in the cell 120 to the cell 220.

In S106, the flight vehicle 100 stops forming the cell 120. In S108, the flight vehicle 100 leaves the orbit of the fixed point flight, and moves to a predetermined location or a designated location.

Figure 3:
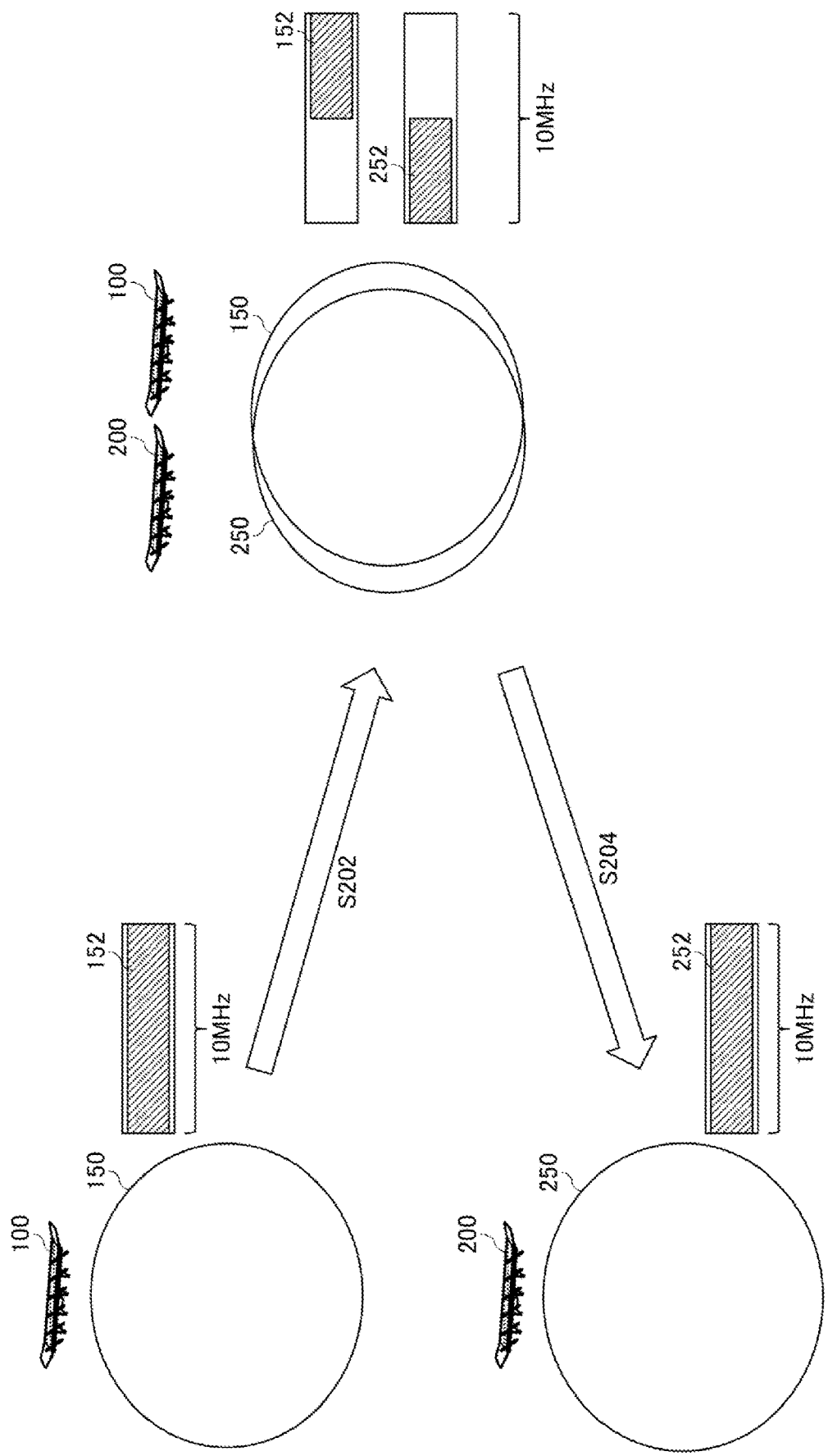
FIG. 3 schematically illustrates one example of the flow of the replacement control processing by the control device 300.

FIG. 3 schematically illustrates one example of the flow of the replacement control processing by the control device 300. Herein, processing of replacing the flight vehicle 100 that forms a cell 150 in a first frequency band which is configured by a single cell with the flight vehicle 200 will be described as an example. The flight vehicle 100 and the flight vehicle 200 may carry out respective operations following instructions of the control device 300. Herein, a case will be described as an example where a bandwidth of the first frequency band is 10 MHz.

In S202, after the flight vehicle 200 moves to a location corresponding to a location of the flight vehicle 100, the flight vehicle 100 continues using 50% equivalent to a second half of the first frequency band and stops using 50% equivalent to a first half of the first frequency band. An operating frequency band 152 of the flight vehicle 100 is 5 MHz equivalent to the second half of the first frequency band. In addition, the flight vehicle 200 forms a cell 250 that corresponds to a cell at 50% equivalent to the first half of the first frequency band and overlaps with the cell 150. An operating frequency band 252 of the flight vehicle 200 is 5 MHz equivalent to the second half of the first frequency band. Subsequently, the flight vehicle 100 carries out handover of the user terminal 30 present in the cell 150 to the cell 250.

When the flight vehicle 200 forms the cell 250, the control device 300 may perform footprint alignment to cause the flight vehicle 200 and the flight vehicle 100 to align the locations of the cell 150 and the cell 250. The control device 300 may perform the footprint alignment by notifying the flight vehicle 200 of the location of the cell 150, notifying the flight vehicle 100 of the location of the cell 250, or notifying the flight vehicle 200 of the location of the cell 150 and also notifying the flight vehicle 100 of the location of the cell 250. In addition, to align the locations of the cell 150 and the cell 250, the control device 300 may also designate the location of the cell 250 for the flight vehicle 200, or designate the location of the cell 150 for the flight vehicle 100. In addition, the footprint alignment may also be autonomously carried out by the flight vehicle 100 and the flight vehicle 200.

In S204, the flight vehicle 100 stops forming the cell 150, leaves the orbit of the fixed point flight, and moves to a predetermined location or a designated location. In addition, the flight vehicle 200 increases the operating frequency band. For example, the flight vehicle 200 changes the operating frequency band from 5 MHz equivalent to the first half of the first frequency band to the entire first frequency band.

As illustrated in FIG. 3, the flight vehicle 100 and the flight vehicle 200 are controlled such that, after the flight vehicle 200 moves to the location corresponding to the location of the flight vehicle 100 that forms the cell 150 in the first frequency band configured by the single cell, the flight vehicle 100 continues using the one part of the frequency band in the first frequency band and stops using the remaining part of the frequency band in the first frequency band, and also the flight vehicle 200 forms the cell in the frequency band excluding the one part of the frequency band but including the remaining part of the frequency band, which overlaps with the cell by the flight vehicle 100, the flight vehicle 100 stops forming the cell, and the flight vehicle 200 increases the operating frequency band, so that seamless switching of the wireless communication services can be realized, and appropriate replacement of the flight vehicle 100 with the flight vehicle 200 can be realized.

Figure 4:
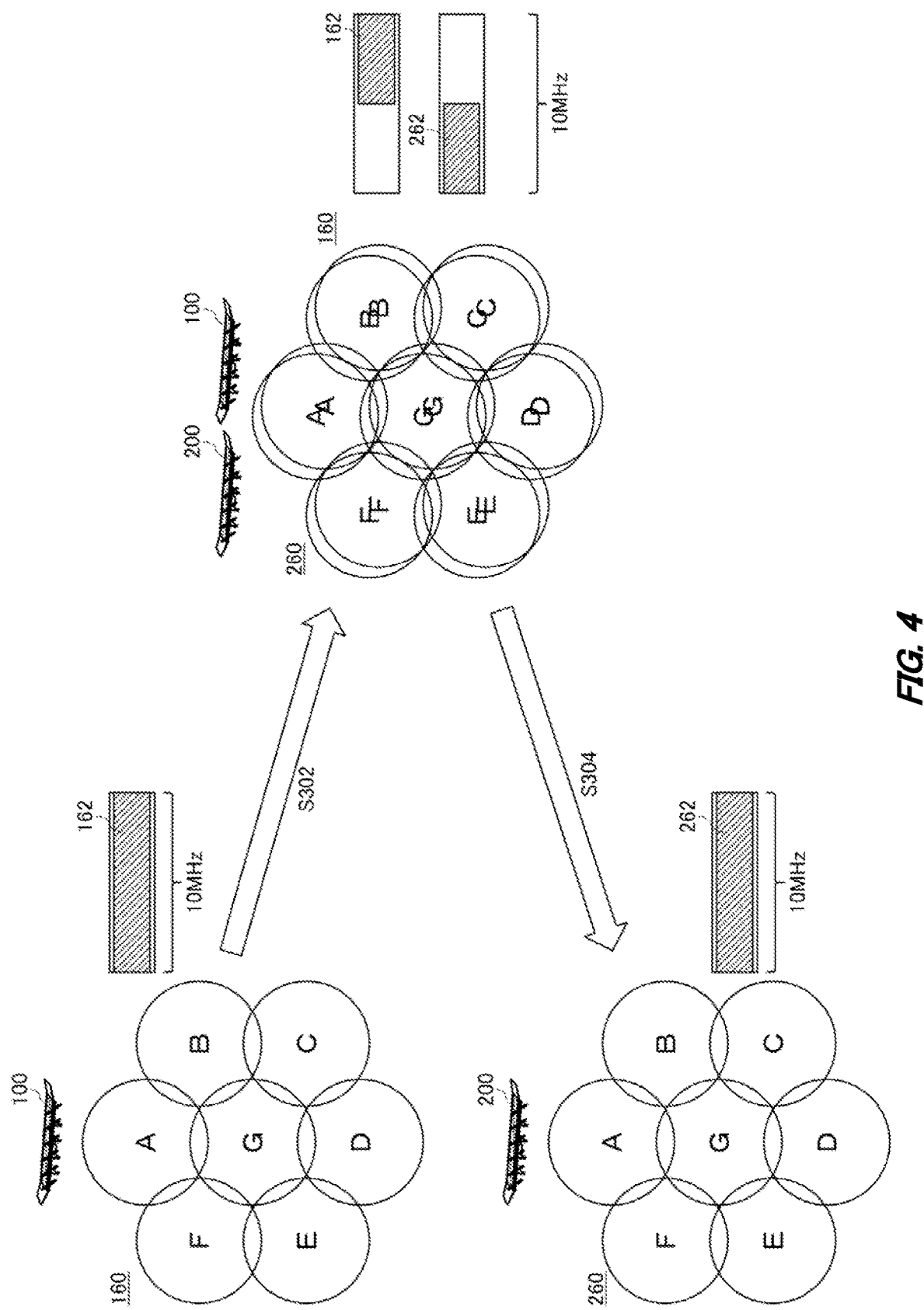
FIG. 4 schematically illustrates one example of the flow of the replacement control processing by the control device 300.

FIG. 4 schematically illustrates one example of the flow of the replacement control processing by the control device 300. Herein, processing of replacing the flight vehicle 100 that forms multiple cells 160 in a first frequency band with the flight vehicle 200 will be described as an example. The flight vehicle 100 and the flight vehicle 200 may carry out respective operations following instructions of the control device 300. Herein, a case will be described as an example where a bandwidth of the first frequency band is 10 MHz.

In S302, after the flight vehicle 200 moves to a location corresponding to a location of the flight vehicle 100, the flight vehicle 100 continues using 50% equivalent to the second half of the first frequency band and stops using 50% equivalent to the first half of the first frequency band. An operating frequency band 162 of the flight vehicle 100 is 5 MHz equivalent to the second half of the first frequency band. In addition, the flight vehicle 200 forms multiple cells 260 that are cells at 50% equivalent to the first half of the first frequency band which overlap with the multiple cells 160. An operating frequency band 262 of the flight vehicle 200 is 5 MHz equivalent to the second half of the first frequency band. Subsequently, the flight vehicle 100 carries out handover of the user terminal 30 present in the multiple cells 160 to the multiple cells 260.

When causing the flight vehicle 200 to form the multiple cells 260, the control device 300 may perform the footprint alignment for causing the flight vehicle 200 and the flight vehicle 100 to align the locations of the multiple cells 160 and the multiple cells 260. The control device 300 may perform the footprint alignment by notifying the flight vehicle 200 of the locations of the multiple cells 160, notifying the flight vehicle 100 of the locations of the multiple cells 260, or notifying the flight vehicle 200 of the locations of the multiple cells 160 and also notifying the flight vehicle 100 of the locations of the multiple cells 260. In addition, to align the locations of the multiple cells 160 and the multiple cells 260, the control device 300 may also designate the locations of the multiple cells 260 for the flight vehicle 200, or designate the locations of the multiple cells 160 for the flight vehicle 100. In addition, the footprint alignment may also be autonomously carried out by the flight vehicle 100 and the flight vehicle 200.

In S304, the flight vehicle 100 stops forming the multiple cells 160, leaves the orbit of the fixed point flight, and moves to a predetermined location or a designated location. In addition, the flight vehicle 200 increases the operating frequency band. For example, the flight vehicle 200 changes the operating frequency band from 5 MHz equivalent to the first half of the first frequency band to the entire first frequency band.

As illustrated in FIG. 4, the flight vehicle 100 and the flight vehicle 200 are controlled such that, after the flight vehicle 200 moves to the location corresponding to the location of the flight vehicle 100 that forms the multiple cells 160, the flight vehicle 100 continues using the one part of the frequency band in the first frequency band and stops using the remaining part of the frequency band in the first frequency band, and also the flight vehicle 200 forms the multiple cells 260 that correspond to the multiple cells in the frequency band excluding the one part of the frequency band but including the remaining part of the frequency band, which overlap with the multiple cells 160 by the flight vehicle 100, and the flight vehicle 100 stops forming the multiple cells 160, so that the seamless switching of the wireless communication services can be realized, and the appropriate replacement of the flight vehicle 100 with the flight vehicle 200 can be realized.

Figure 5:
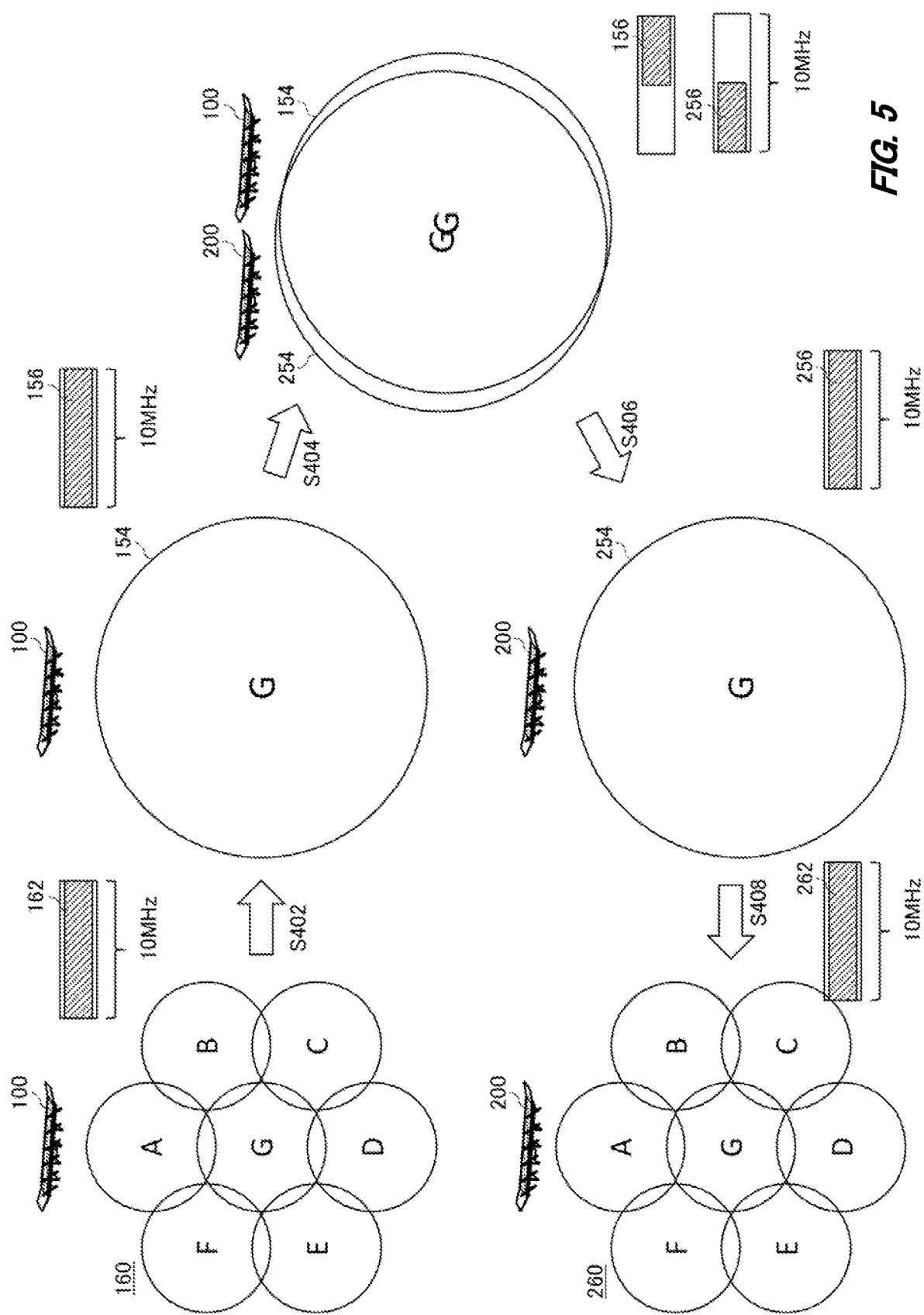
FIG. 5 schematically illustrates one example of the flow of the replacement control processing by the control device 300.

FIG. 5 schematically illustrates one example of the flow of the replacement control processing by the control device 300. Herein, a difference from FIG. 4 will be mainly described.

In S402, the flight vehicle 100 changes the multiple cells 160 to a virtual single cell 154 by a single frequency network (SFN). For example, the flight vehicle 100 may change the multiple cells 160 to the virtual single cell 154 by determining one of a plurality of cells included in the multiple cells 160 as a main cell, expanding the main cell, and stopping cells other than the main cell. An operating frequency band 156 of the flight vehicle 100 is an entire first frequency band.

In S404, after the flight vehicle 200 moves to a location corresponding to a location of the flight vehicle 100, the flight vehicle 100 continues using 50% equivalent to the second half of the first frequency band and stops using 50% equivalent to the first half of the first frequency band. The operating frequency band 156 of the flight vehicle 100 is 5 MHz equivalent to the second half of the first frequency band. In addition, the flight vehicle 200 forms a cell 254 that corresponds to a cell at 50% equivalent to the first half of the first frequency band and overlaps with the virtual single cell 154. An operating frequency band 256 of the flight vehicle 200 is 5 MHz equivalent to the first half of the first frequency band. At this time, the control device 300 may cause the flight vehicle 200 and the flight vehicle 100 to perform the footprint alignment for aligning the locations of the virtual single cell 154 and the cell 254. Subsequently, the flight vehicle 100 carries out handover of the user terminal 30 present in the virtual single cell 154 to the cell 254.

In S406, the flight vehicle 100 stops forming the virtual single cell 154, leaves the orbit of the fixed point flight, and moves to a predetermined location or a designated location. In addition, the flight vehicle 200 increases the operating frequency band. For example, the flight vehicle 200 changes the operating frequency band from 5 MHz equivalent to the first half of the first frequency band to the entire first frequency band.

In S408, the flight vehicle 200 forms the multiple cells 260. The flight vehicle 200 may form the multiple cells 260 by reducing the cell 254 and also forming a plurality of other cells. The operating frequency band 262 of the flight vehicle 200 is the entire first frequency band.

As illustrated in FIG. 5, the flight vehicle 100 and the flight vehicle 200 are controlled such that, after the flight vehicle 100 that forms the multiple cells 160 changes the multiple cells 160 to the virtual single cell 154, the flight vehicle 200 moves to the location corresponding to the location of the flight vehicle 100, and the flight vehicle 100 continues using the one part of the frequency band in the first frequency band and stops using the remaining part of the frequency band in the first frequency band, and also the flight vehicle 200 forms the cell 254 that corresponds to the cell in the frequency band excluding the one part of the frequency band but including the remaining part of the frequency band, which overlaps with the cell by the flight vehicle 100, and the flight vehicle 100 stops forming the virtual single cell 154, and also the flight vehicle 200 forms the multiple cells 260, so that as compared with the example illustrated in FIG. 4, the footprint alignment for each cell of the multiple cells 160 and the multiple cells 260 can be avoided, and the processing can be simplified.

Note that in the case of the replacement control processing illustrated in FIG. 5, wireless instantaneous interruption may occur in the user terminals 30 present in a cell A, a cell B, a cell C, a cell D, a cell E, and a cell F when the flight vehicle 100 changes the multiple cells 160 to the virtual single cell 154 in S402.

For example, the control device 300 may determine a cell located in a center of a plurality of cells included in the multiple cells 160 as the main cell. In addition, the control device 300 may determine a cell having a largest total size of areas overlapped with other cells among the plurality of cells included in the multiple cells 160 as the main cell. In the example illustrated in FIG. 5, a cell G is determined as the main cell. Then, the control device 300 may change the multiple cells 160 to the virtual single cell 154 by expanding the main cell and stopping the cells other than the main cell. Thereby, it is possible to increase the number of the user terminals 30 that can avoid the wireless instantaneous interruption among the user terminals 30 present in the cells other than the main cell by the handover to the main cell.

In addition, the control device 300 may determine a cell having a highest communication traffic among the plurality of cells included in the multiple cells 160 as the main cell. Then, the control device 300 may change the multiple cells 160 to the virtual single cell 154 by expanding the main cell and stopping the cells other than the main cell. Thereby, as compared with the case where the other cell is determined as the main cell, the number of the user terminals 30 where the wireless instantaneous interruption occurs can be reduced.

Figure 6:
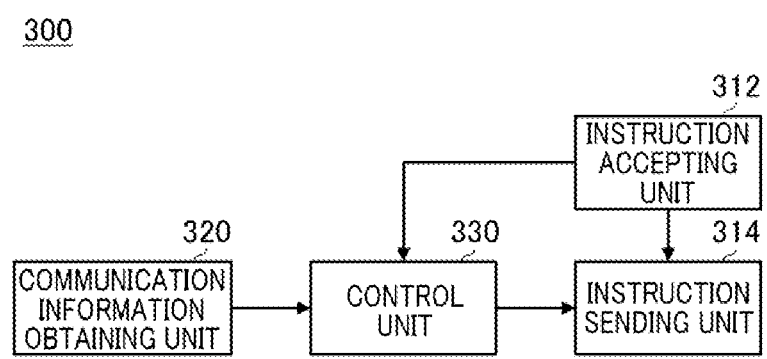
FIG. 6 schematically illustrates one example of a functional configuration of the control device 300.

FIG. 6 schematically illustrates one example of a functional configuration of the control device 300. The control device 300 includes an instruction accepting unit 312, an instruction sending unit 314, a communication information obtaining unit 320, and a control unit 330.

The instruction accepting unit 312 accepts various instructions. The instruction accepting unit 312 accepts an instruction for designating the target area 40, for example. In addition, the instruction accepting unit 312 accepts an instruction for designating an orbit where the flight vehicle 100 performs the fixed point flight, for example. In addition, the instruction accepting unit 312 accepts an instruction for designating a location where a cell is formed, for example. The instruction accepting unit 312 may accept an instruction that is input via an operation unit included in the control device 300. In addition, the instruction accepting unit 312 may also accept an instruction received via the network 20 via a communication unit included in the control device 300.

The instruction sending unit 314 sends the instruction accepted by the instruction accepting unit 312 to the flight vehicle 100. The instruction sending unit 314 may send the instruction to a plurality of flight vehicles 100. The instruction sending unit 314 may also send an instruction to one flight vehicle 100 among the plurality of flight vehicles 100, and cause the one flight vehicle 100 to send the instruction to the other flight vehicles 100.

The communication information obtaining unit 320 obtains communication information related to the communication in the wireless communication service provided to the user terminal 30 by the cell that is formed by the flight vehicle 100. The communication information obtaining unit 320 obtains information related to the communication traffic, for example. The communication information obtaining unit 320 may receive the communication information from the communication management device 400.

The control unit 330 carries out various controls. The control unit 330 carries out the replacement control processing of the flight vehicle 100. The control unit 330 may control the flight vehicle 100 by sending various instructions to the flight vehicle 100 via the instruction sending unit 314. The control unit 330 may send a plurality of instructions to the flight vehicle 100 at respective timings, or may also send the plurality of instructions to the flight vehicle 100 at the same time. The control unit 330 may be one example of a replacement control unit.

For example, the control unit 330 controls replacement of the first flight vehicle 100 that covers a target area on a ground by a cell with the second flight vehicle 100. The control unit 330 may control the first flight vehicle 100 and the second flight vehicle 100 such that, after the second flight vehicle 100 moves to a location corresponding to a location of the first flight vehicle 100, the first flight vehicle 100 continues using one part of a frequency band in a first frequency band and stops using a remaining part of the frequency band in the first frequency band, and also the second flight vehicle 100 forms a cell in a frequency band excluding the one part of the frequency band but including the remaining part of the frequency band, which overlaps with the cell formed by the first flight vehicle 100, and the first flight vehicle 100 stops forming the cell.

For example, the control unit 330 may cause the first flight vehicle 100 to continue using 50% of the first frequency band and stop using the frequency band corresponding to the remaining part at 50% of the first frequency band. Then, the control unit 330 may cause the second flight vehicle 100 to form a cell in a frequency band that includes 50% of the first frequency band which the first flight vehicle 100 stops using and does not include 50% of the first frequency band which the first flight vehicle 100 continues using. Herein, 50% is used as an example, but the proportion is not limited to this, and any proportion may also be used. For example, the control unit 330 may cause the first flight vehicle 100 to continue using 20% of the first frequency band and stop using the frequency band corresponding to the remaining part at 80% of the first frequency band. Then, the control unit 330 may cause the second flight vehicle 100 to form a cell in a frequency band that includes 80% of the first frequency band which the first flight vehicle 100 stops using and does not include 20% of the first frequency band which the first flight vehicle 100 continues using.

The control unit 330 may control the first flight vehicle 100 and the second flight vehicle 100 such that, after the first flight vehicle 100 continues using one part of a frequency band in the first frequency band and stops using a remaining part of the frequency band in the first frequency band and also the second flight vehicle 100 forms a cell in a frequency band excluding the one part of the frequency band but including the remaining part of the frequency band, which overlaps with the cell formed by the first flight vehicle 100, the first flight vehicle 100 carries out handover of the user terminal present in the cell of the first flight vehicle 100 to the cell of the second flight vehicle 100.

The control unit 330 may control the first flight vehicle 100 such that the first flight vehicle 100 carries out the handover of the user terminal 30 present in the cell of the first flight vehicle 100 to the cell of the second flight vehicle 100 by sending a handover instruction to the user terminal 30 present in the cell of the first flight vehicle 100. The control unit 330 may control the first flight vehicle 100 such that the first flight vehicle 100 carries out the handover of the user terminal 30 present in the cell of the first flight vehicle 100 to the cell of the second flight vehicle 100 by sending the handover instruction to the user terminal 30 present in the cell of the first flight vehicle 100 and also rejecting a connection request.

In addition, the control unit 330 may control the first flight vehicle 100 and the second flight vehicle 100 such that, after the second flight vehicle 100 moves into an orbit of the first flight vehicle 100 that performs fixed point flight over the target area, the first flight vehicle 100 continues using the one part of the frequency band in the first frequency band and stops using the remaining part of the frequency band in the first frequency band, and also the second flight vehicle 100 forms the cell in the frequency band excluding the one part of the frequency band but including the remaining part of the frequency band, which overlaps with the cell formed by the first flight vehicle 100, and the first flight vehicle 100 stops forming the cell.

In addition, the control unit 330 may control the first flight vehicle 100 and the second flight vehicle 100 such that, after the second flight vehicle 100 moves to the location corresponding to the location of the first flight vehicle 100 that covers the target area on the ground by multiple cells in the first frequency band, the first flight vehicle 100 continues using the one part of the frequency band in the first frequency band and stops using the remaining part of the frequency band in the first frequency band, and also the second flight vehicle 100 forms multiple cells in a frequency band excluding the one part of the frequency band but including the remaining part of the frequency band, which overlap with the multiple cells formed by the first flight vehicle, and the first flight vehicle 100 stops forming the multiple cells. In a case where the control unit 330 causes the first flight vehicle 100 to continue using the one part of the frequency band in the first frequency band and stop using the remaining part of the frequency band in the first frequency band, this operation may be performed at the same time with regard to all sub-cells of the multiple cells, or may also be performed by staggering time in units of the sub-cell of the multiple cells.

In addition, the control unit 330 may control the first flight vehicle 100 and the second flight vehicle 100 such that, after the first flight vehicle 100 that covers the target area on the ground by multiple cells in the first frequency band changes the multiple cells to a virtual single cell, the second flight vehicle 100 moves to the location corresponding to the location of the first flight vehicle 100, and the first flight vehicle 100 continues using the one part of the frequency band in the first frequency band and stops using the remaining part of the frequency band in the first frequency band, and also the second flight vehicle 100 forms a cell in a frequency band excluding the one part of the frequency band but including the remaining part of the frequency band, which overlaps with the cell formed by the first flight vehicle 100, and the first flight vehicle 100 stops forming the virtual single cell, and also the second flight vehicle 100 forms multiple cells.

The control unit 330 may determine a cell located in a center of the multiple cells formed by the first flight vehicle 100 as the main cell. In addition, the control unit 330 may determine a cell that has a largest total size of areas overlapped with other cells among the multiple cells formed by the first flight vehicle 100 as the main cell. In addition, the control unit 330 may determine the main cell based on a communication traffic of each of the multiple cells formed by the first flight vehicle 100. For example, the control unit 330 determines a cell that has a highest communication traffic among the multiple cells formed by the first flight vehicle 100 as the main cell.

Figure 7:
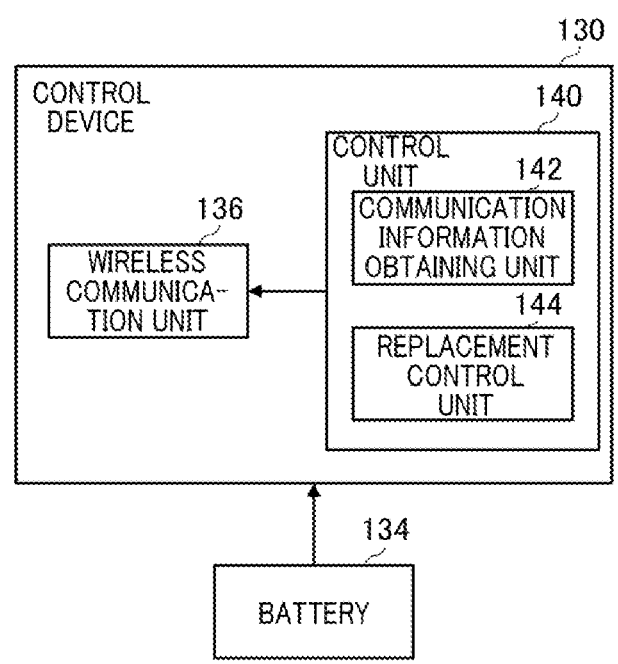
FIG. 7 schematically illustrates one example of a functional configuration of a control device 130 included in the flight vehicle 100.

FIG. 7 schematically illustrates one example of a functional configuration of a control device 130 included in the flight vehicle 100. The control device 130 includes a wireless communication unit 136 and a control unit 140.

The wireless communication unit 136 carries out various communications using electrical power stored in a battery 134. For example, the wireless communication unit 136 forms the cell 120. The wireless communication unit 136 may carry out communication with the network 20. The wireless communication unit 136 may carry out communication with the control device 300. The wireless communication unit 136 may carry out communication with the communication management device 400. The wireless communication unit 136 may carry out communication with another flight vehicle 100. The wireless communication unit 136 may carry out communication with a communications satellite.

The control unit 140 controls flight of the flight vehicle 100. In addition, the control unit 140 controls formation of a cell by the wireless communication unit 136. The control unit 140 may control the flight of the flight vehicle 100 and the formation of the cell following instructions from the control device 300.

The control unit 140 has a communication information obtaining unit 142 and a replacement control unit 144. The communication information obtaining unit 142 obtains communication information related to the communication in the wireless communication service provided to the user terminal 30 by the cell formed by the flight vehicle 100. For example, the communication information obtaining unit 142 obtains information related to a communication traffic. The communication information obtaining unit 142 may receive the communication information from the communication management device 400.

The replacement control unit 144 controls replacement with another flight vehicle 100. For example, when its own flight vehicle (the flight vehicle 100 to which the replacement control unit 144 is mounted is referred to as its own flight vehicle in some cases) covers a target area by the cell in the first frequency band which is formed by the wireless communication unit 136 by performing the fixed point flight over the target area on the ground, the replacement control unit 144 carries out the replacement control processing for replacement with another flight vehicle 100 to cover the target area.

The replacement control unit 144 is configured to control the replacement such that, after the other flight vehicle 100 moves to a location corresponding to a location of its own flight vehicle, its own flight vehicle continues using one part of a frequency band in a first frequency band and stops using a remaining part of the frequency band in the first frequency band, and after handover of the user terminal 30 present in the cell of its own flight vehicle is carried out to the other flight vehicle 100 that forms a cell in a frequency band excluding the one part of the frequency band but including the remaining part of the frequency band, which overlaps with the cell by its own flight vehicle, its own flight vehicle stops forming the cell. Then, the replacement control unit 144 causes its own flight vehicle to move to a predetermined location or a designated location.

In addition, the replacement control unit 144 is configured to control the replacement such that, in a case where its own flight vehicle performs the fixed point flight over the target area, after the other flight vehicle 100 moves into an orbit of the fixed point flight, its own flight vehicle continues using the one part of the frequency band in the first frequency band and stops using the remaining part of the frequency band in the first frequency band, and after handover of the user terminal present 30 in the cell of its own flight vehicle is carried out to the other flight vehicle 100 that forms a cell in a frequency band excluding the one part of the frequency band but including the remaining part of the frequency band, which overlaps with the cell by its own flight vehicle, its own flight vehicle stops forming the cell. Then, the replacement control unit 144 causes its own flight vehicle to move to a predetermined location or a designated location.

In addition, the replacement control unit 144 is configured to control the replacement such that, in a case where its own flight vehicle covers the target area on the ground by multiple cells in the first frequency band, after the other flight vehicle 100 moves to the location corresponding to the location of its own flight vehicle, its own flight vehicle continues using the one part of the frequency band in the first frequency band and stops using the remaining part of the frequency band in the first frequency band, and after handover of the user terminal present 30 in the cell of its own flight vehicle is carried out to the other flight vehicle 100 that forms cells in a frequency band excluding the one part of the frequency band but including the remaining part of the frequency band, which overlap with the cells by its own flight vehicle, its own flight vehicle stops forming the cells. Then, the replacement control unit 144 causes its own flight vehicle to move to a predetermined location or a designated location.

In addition, the replacement control unit 144 is configured to control the replacement such that, in a case where its own flight vehicle covers the target area on the ground by the multiple cells in the first frequency band, initially, its own flight vehicle changes the multiple cells to a virtual single cell, and subsequently, after the other flight vehicle 100 moves to the location corresponding to the location of its own flight vehicle, its own flight vehicle continues using the one part of the frequency band in the first frequency band and stops using the remaining part of the frequency band in the first frequency band, and after handover of the user terminal 30 present in the cell of its own flight vehicle is carried out to the other flight vehicle 100 that forms a cell in a frequency band excluding the one part of the frequency band but including the remaining part of the frequency band, which overlaps with the cell by its own flight vehicle, its own flight vehicle stops forming the cell. Then, the replacement control unit 144 causes its own flight vehicle to move to a predetermined location or a designated location.

In a case where the replacement control unit 144 causes the wireless communication unit 136 to change the multiple cells to the virtual single cell, the multiple cells may be changed to the virtual single cell by determining one cell among the multiple cells as a main cell, expanding the main cell, and stopping the cells other than the main cell among the multiple cells. The replacement control unit 144 may determine a cell located in a center of the multiple cells as the main cell. In addition, the replacement control unit 144 may determine a cell having a largest total size of areas overlapped with other cells among the multiple cells as the main cell. In addition, the replacement control unit 144 may also determine the main cell based on a communication traffic of each of the multiple cells. For example, the replacement control unit 144 determines a cell having a highest communication traffic among the multiple cells as the main cell.

The replacement control unit 144 may also carry out the replacement control processing for replacing the other flight vehicle 100 that covers the target area on the ground by forming the cell in the first frequency band on the ground with its own flight vehicle.

The replacement control unit 144 is configured to control the replacement such that, after its own flight vehicle is caused to move to the location corresponding to the location of another flight vehicle 100 and subsequently the other flight vehicle 100 continues using the one part of the frequency band in the first frequency band and stops using the remaining part of the frequency band in the first frequency band, its own flight vehicle forms a cell in a frequency band excluding the one part of the frequency band but including the remaining part of the frequency band, which overlaps with the cell formed by the other flight vehicle 100. Subsequently, the replacement control unit 144 may increase an operating frequency band. For example, the replacement control unit 144 changes the operating frequency band to the entire first frequency band.

Figure 8:
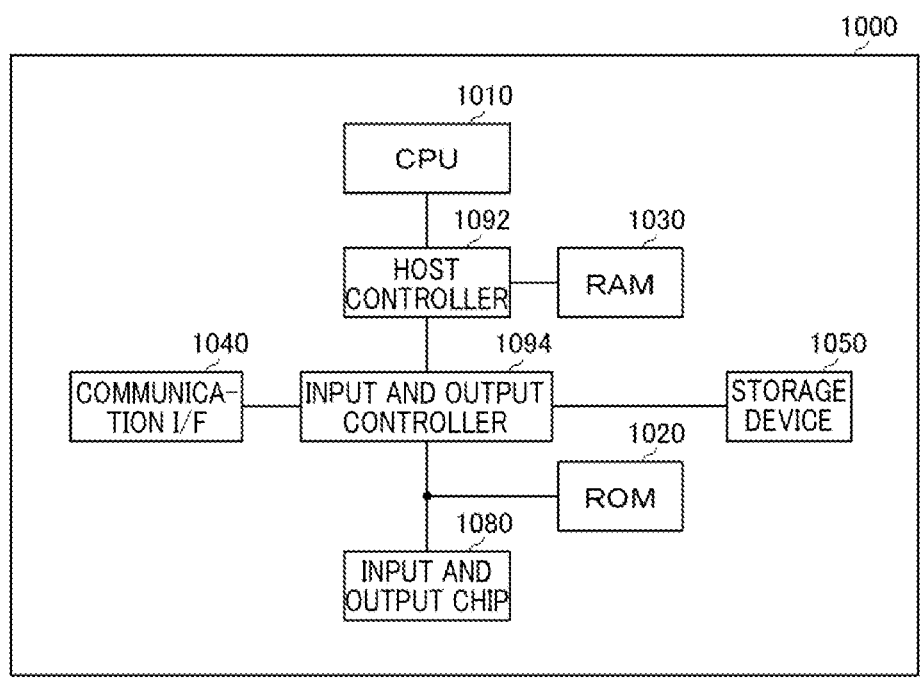
FIG. 8 schematically illustrates one example of a hardware configuration of a computer 1000 that functions as the control device 300.

FIG. 8 schematically illustrates one example of a computer 1000 that functions as the control device 130 or the control device 300. The computer 1000 according to the present embodiment includes a CPU peripheral unit having a CPU 1010 and a RAM 1030 that are mutually connected by a host controller 1092, and an input and output unit having a ROM 1020, a communication I/F 1040, a storage device 1050, and an input and output chip 1080 that are connected to a host controller 1092 by an input and output controller 1094.

The CPU 1010 operates based on programs stored in the ROM 1020 and the RAM 1030, and controls the respective units. The communication I/F 1040 communicates with another device via a network. In addition, the communication I/F 1040 functions as hardware configured to perform communication. The storage device 1050 may be a hard disc drive, a solid state disc, a solid state drive, and the like, and is configured to store the programs and data used by the CPU 1010.

The ROM 1020 stores a boot program carried out at the time of the activation of the computer 1000, programs dependent on hardware of the computer 1000, and the like. For example, the input and output chip 1080 connects various input and output devices to the input and output controller 1094 via a USB port, a parallel port, a serial port, a keyboard port, a mouse port, and the like.

The program provided to the storage device 1050 via the RAM 1030 is provided to a user while the program is stored in a recording medium such as an IC card. The program is read out from the recording medium, installed in the storage device 1050 via the RAM 1030, and carried out in the CPU 1010.

The program installed in the computer 1000 and configured to cause the computer 1000 to function as the control device 130 or the control device 300 may cause the computer 1000 to individually function as each unit of the control device 130 or the control device 300 by working with the CPU 1010 or the like. Information processing described in these programs that is read into the computer 1000 functions as the wireless communication unit 136 and the control unit 140 serving as specific means in which software and the above-mentioned various hardware resources cooperate with each other. In addition, the information processing described in these programs that is read into the computer 1000 functions as the instruction accepting unit 312, the instruction sending unit 314, the communication information obtaining unit 320, and the control unit 330 serving as specific means in which software and the above-mentioned various hardware resources cooperate with each other. Then, when calculations or processes of the information corresponding to an intended use of the computer 1000 according to the present embodiment are realized by these specific means, the control device 130 or the control device 300 unique to the intended use is constructed.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20 network, 22 gateway, 30 user terminal, 40 target area, 100 flight vehicle, 102 main body portion, 104 main wing portion, 106 propeller, 108 skid, 110 wheel, 112 solar panel, 120 cell, 122 sub-cell, 130 control device, 134 battery, 136 wireless communication unit, 140 control unit, 142 communication information obtaining unit, 144 replacement control unit, 150 cell, 152 operating frequency band, 154 virtual single cell, 156 operating frequency band, 160 multiple cells, 162 operating frequency band, 200 flight vehicle, 220 cell, 250 cell, 252 operating frequency band, 254 cell, 256 operating frequency band, 260 multiple cells, 262 operating frequency band, 300 control device, 312 instruction accepting unit, 314 instruction sending unit, 320 communication information obtaining unit, 330 control unit, 1000 computer, 1010 CPU, 1020 ROM, 1030 RAM, 1040 communication I/F, 1050 storage device, 1080 input and output chip, 1092 host controller, 1094 input and output controller

What is claimed is:

1. A method for controlling flight vehicles, each of the flight vehicles having an antenna configured to form a respective cell on a ground and provide wireless communication service to a user terminal in the respective cell, the method comprising:
   controlling replacement of a first flight vehicle that covers a target area on the ground by a first cell in a first frequency band with a second flight vehicle, wherein after the second flight vehicle moves to a location corresponding to a location of the first flight vehicle:
   the first flight vehicle is controlled to continue using one part of a frequency band in the first frequency band and to stop using a remaining part of the frequency band in the first frequency band,
   the second flight vehicle is controlled to form a second cell in a frequency band excluding the one part of the frequency band but including the remaining part of the frequency band, the second cell overlapping with the first cell formed by the first flight vehicle, and
   the first flight vehicle is controlled to stop forming the first cell.

2. The method according to claim 1, further comprising:
   controlling the first flight vehicle to carry out handover of the user terminal present in the first cell of the first flight vehicle to the second cell of the second flight vehicle.

3. The method according to claim 2, wherein the first flight vehicle carries out the handover of the user terminal present in the first cell of the first flight vehicle to the second cell of the second flight vehicle by sending a handover instruction to the user terminal present in the first cell of the first flight vehicle.

4. The method according to claim 3, wherein the first flight vehicle carries out the handover of the user terminal present in the first cell of the first flight vehicle to the second cell of the second flight vehicle by sending the handover instruction to the user terminal present in the first cell of the first flight vehicle and also rejecting a connection request.

5. The method according to claim 1, wherein the controlling replacement of the first flight vehicle with the second flight vehicle is performed after the second flight vehicle moves into an orbit of the first flight vehicle that performs a fixed point flight over the target area.

6. The method according to claim 2, wherein the controlling replacement of the first flight vehicle with the second flight vehicle is performed after the second flight vehicle moves into an orbit of the first flight vehicle that performs a fixed point flight over the target area.

7. The method according to claim 3, wherein the controlling replacement of the first flight vehicle with the second flight vehicle is performed after the second flight vehicle moves into an orbit of the first flight vehicle that performs a fixed point flight over the target area.

8. The method according to claim 4, wherein the controlling replacement of the first flight vehicle with the second flight vehicle is performed after the second flight vehicle moves into an orbit of the first flight vehicle that performs a fixed point flight over the target area.

9. The method according to claim 1, wherein:
the first flight vehicle covers the target area on the ground by a plurality of the first cells; and
the controlling replacement of the first flight vehicle with the second flight vehicle is performed after the second flight vehicle moves to the location corresponding to the location of the first flight vehicle.

10. The method according to claim 2, wherein:
the first flight vehicle covers the target area on the ground by a plurality of the first cells; and
the controlling replacement of the first flight vehicle with the second flight vehicle is performed after the second flight vehicle moves to the location corresponding to the location of the first flight vehicle.

11. The method according to claim 1, wherein:
the first flight vehicle covers the target area on the ground by a plurality of the first cells, and
the second flight vehicle covers the target area on the ground by a plurality of the second cells, the method further comprising:
controlling the first flight vehicle to change the plurality of the first cells to a virtual single cell, wherein the controlling the first flight vehicle to stop forming the first cell stops forming the virtual single cell.

12. The method according to claim 11, wherein the first flight vehicle is controlled such that the plurality of the first cells are changed to the virtual single cell by determining one cell among the plurality of the first cells formed by the first flight vehicle as a main cell, expanding the main cell, and stopping cells other than the main cell among the plurality of the first cells.

13. The method according to claim 12, wherein the main cell is the one cell among the plurality of the first cells that is located in a center of the plurality of the first cells.

14. The method according to claim 12, wherein the main cell is the one cell among the plurality of the first cells that has a largest total size of areas overlapped with other cells among the plurality of the first cells.

15. The method according to claim 12, wherein the main cell is determined to be the one cell among the plurality of the first cells based on a communication traffic of each of the plurality of the first cells.

16. The method according to claim 15, wherein the main cell has a highest communication traffic among the plurality of the first cells.

17. A non-transitory computer-readable media having information embodied therein which, when executed on a processor, causes control of flight vehicles, each of the flight vehicles having an antenna configured to form a respective cell on a ground and provide wireless communication service to a user terminal in the respective cell, the control causing replacement of a first flight vehicle that covers a target area on the ground by a first cell in a first frequency band with a second flight vehicle, wherein after the second flight vehicle moves to a location corresponding to a location of the first flight vehicle:
the first flight vehicle is controlled to continue using one part of a frequency band in the first frequency band and to stop using a remaining part of the frequency band in the first frequency band,
the second flight vehicle is controlled to form a second cell in a frequency band excluding the one part of the frequency band but including the remaining part of the frequency band, the second cell overlapping with the first cell formed by the first flight vehicle, and
the first flight vehicle is controlled to stop forming the first cell.

18. A control method of controlling flight vehicles, each of the flight vehicles having an antenna configured to form a cell on a ground and provide wireless communication service to a user terminal in the cell, the control method comprising:
controlling replacement of a first flight vehicle that covers a target area on the ground by a cell in a first frequency band with a second flight vehicle, wherein
the controlling includes controlling the first flight vehicle and the second flight vehicle such that, after the second flight vehicle moves to a location corresponding to a location of the first flight vehicle, the first flight vehicle continues using one part of a frequency band in the first frequency band and stops using a remaining part of the frequency band in the first frequency band, and also the second flight vehicle forms a cell in a frequency band excluding the one part of the frequency band but including the remaining part of the frequency band, which overlaps with the cell formed by the first flight vehicle, and the first flight vehicle stops forming the cell.

19. A method of replacing coverage by a first flight vehicle with coverage by a second flight vehicle, the first flight vehicle and the second flight vehicle each having an antenna configured to form a respective cell on a ground and providing wireless communication service to a user terminal in the respective cell, the carrying out replacing coverage of a first cell in a first frequency band in a target area with a second cell in the first frequency band by the second flight vehicle, the method comprising:
controlling the replacement such that, after the second flight vehicle moves to a location corresponding to a location of the first flight vehicle, the first flight vehicle continues using one part of a frequency band in the first frequency band and stops using a remaining part of the frequency band in the first frequency band, and after handover of the user terminal present in the first cell of the first flight vehicle is carried out to the second flight vehicle that forms a second cell in a frequency band excluding the one part of the frequency band but including the remaining part of the frequency band, which overlaps with the first cell by the first flight vehicle, and
controlling the first flight vehicle to stop forming the first cell.

20. A method of having coverage of a cell in a first frequency band in a target area on a ground by a first flight vehicle replaced with coverage by a second flight vehicle, each having an antenna configured to form a respective cell on the ground and providing wireless communication service to a user terminal in the respective cell, the method comprising:
controlling the replacement such that, after the first flight vehicle moves to a location corresponding to a location of the second flight vehicle and the second flight vehicle continues using one part of a frequency band in the first frequency band and stops using a remaining part of the frequency band in the first frequency band, the first flight vehicle forms a first cell in a frequency band excluding the one part of the frequency band but including the remaining part of the frequency band, which overlaps with a second cell formed by the second flight vehicle; and controlling the first flight vehicle to stop forming the first cell.

* * * * *